US011409316B2

(12) United States Patent
Knobloch

(10) Patent No.: US 11,409,316 B2
(45) Date of Patent: Aug. 9, 2022

(54) METHOD FOR OPERATING AN ENERGY GENERATING SYSTEM, AND INVERTER FOR AN ENERGY GENERATING SYSTEM

(71) Applicant: SMA Solar Technology AG, Niestetal (DE)

(72) Inventor: Andreas Knobloch, Kassel (DE)

(73) Assignee: SMA Solar Technology AG, Niestetal (DE)

(*) Notice: Subject to any disclaimer, the term of this patent is extended or adjusted under 35 U.S.C. 154(b) by 126 days.

(21) Appl. No.: 17/015,254

(22) Filed: Sep. 9, 2020

(65) Prior Publication Data
US 2020/0409404 A1 Dec. 31, 2020

Related U.S. Application Data

(63) Continuation of application No. PCT/EP2019/054758, filed on Feb. 26, 2019.

(30) Foreign Application Priority Data

Mar. 9, 2018 (DE) .................... 10 2018 105 483.1

(51) Int. Cl.
G05F 1/67 (2006.01)
H02S 40/32 (2014.01)
H02J 3/38 (2006.01)

(52) U.S. Cl.
CPC ............... *G05F 1/67* (2013.01); *H02J 3/381* (2013.01); *H02S 40/32* (2014.12); *H02J 2300/26* (2020.01)

(58) Field of Classification Search
CPC .. G05F 1/67; H02S 40/32; H02J 3/381; H02J 2300/26; H02J 3/16; H02J 3/24; H02J 3/38; H02J 3/48; H02J 3/50
See application file for complete search history.

(56) References Cited

U.S. PATENT DOCUMENTS 6,107,784 A 8/2000 Nomiya
9,941,814 B2 * 4/2018 Farese .................... H02J 3/382
(Continued)

FOREIGN PATENT DOCUMENTS

CN 105186566 A 12/2015
DE 102016203123 A1 8/2017

OTHER PUBLICATIONS

International Search Report dated Mar. 29, 2019 in connection with PCT/EP2019/054758.

Primary Examiner — Adolf D Berhane
(74) Attorney, Agent, or Firm — Eschweiler & Potashnik, LLC

(57) ABSTRACT

A method for operating an energy generation system containing a photovoltaic generator and an inverter, wherein electric power is transferred between the inverter and an AC voltage grid, and wherein the transferred electric power comprises an active power (P) and a reactive power (Q) is disclosed. The method includes operating the photovoltaic generator, in a first operating mode, at a maximum active power point (MPP) by way of the inverter, and setting the active power (P) of the photovoltaic generator via the inverter in a second operating mode depending on a grid frequency instantaneous value (f) and on a grid frequency rate of change (df/dt), and in the second operating mode, setting the reactive power (Q) depending on a grid voltage instantaneous value (U) and on a grid voltage rate of change (dU/dt).

13 Claims, 7 Drawing Sheets

(56) References Cited

U.S. PATENT DOCUMENTS

| | | |
|---|---|---|
| 2008/0252076 A1 | 10/2008 | Fortmann |
| 2012/0262960 A1 | 10/2012 | Giraut Ruso |
| 2014/0204613 A1 | 7/2014 | Blanz |
| 2016/0190810 A1 | 6/2016 | Bhavaraju |
| 2016/0313716 A1 | 10/2016 | Chen |
| 2019/0211803 A1 | 7/2019 | Brombach |
| 2022/0037900 A1* | 2/2022 | Hira ..................... H02J 7/0048 |

* cited by examiner

METHOD FOR OPERATING AN ENERGY GENERATING SYSTEM, AND INVERTER FOR AN ENERGY GENERATING SYSTEM

CROSS REFERENCE TO RELATED APPLICATIONS

This application is a continuation of International Patent Application number PCT/EP2019/054758, filed on Feb. 26, 2019, which claims priority to German Patent Application number 10 2018 105 483.1, filed on Mar. 9, 2018, and is hereby incorporated by reference in its entirety.

FIELD

The disclosure relates to a method for operating an energy generation system on an AC voltage grid, and to an inverter for an energy generation system.

BACKGROUND

In the context of energy transition, converter-based energy generation systems, in particular photovoltaic systems containing inverters, are increasingly being connected to AC voltage grids and are replacing conventional power plants containing synchronous generators and corresponding flywheel mass, which traditionally ensure sufficient inertia and thus stability of the AC voltage grid. As a result, the stability of the AC voltage grid in the event of high regional saturation with converter-based energy generation systems is difficult to manage using conventional control methods, meaning that major faults, in particular those with a grid disconnection at critical points, lead to large-scale grid failures. In order to ensure grid stability even when a AC voltage grid is completely saturated by converter-based energy generation systems without having to rely on conventional minimum generation, there is a need for control processes and system solutions that are able to ensure that the AC voltage grid is largely technically independent of conventional power plants and it is therefore possible to implement a high proportion of renewable energies in order to supply the loads in an AC voltage grid. Of particular importance in this case is transient stability in the short-term range, that is to say in a time range from zero to approximately thirty seconds after a fault event, such as for example a sudden failure of a heavily loaded line in a transmission grid.

The stability of an electrical AC voltage grid, in particular the frequency stability, depends on the balance between generation and consumption in the AC voltage grid. In the event of an imbalance between generated power and consumed power, the grid frequency consequently changes, in particular depending on the grid inertia, the magnitude of the power difference between the generated power and the consumed power, and the rate of change of the power difference.

One of the most critical faults from the point of view of frequency stability is what is called a system split, in which a transmission line between two grid sections is disconnected, for example due to an overload. Although many small renewable energy generation systems are being built over a relatively large area, it is not always possible to build energy generation systems with a high power (for example large PV, wind or hydropower plants) close to the consumer, for various reasons. When there is little sun and wind, it will often also be necessary to draw missing power from outside a grid section. Therefore, disconnection of a critical line between two grid sections is particularly critical if there was a high level of power exchange between the grid sections before the disconnection, for example because generators and consumers are spatially far apart from one another and are separated by the disconnection. In this case, the grid section that was drawing power via the transmission line has insufficient generated power available after the fault has occurred, meaning that the grid frequency in this grid section begins to drop, while there is excess generated power present in the grid section that was outputting power via the transmission line, meaning that the grid frequency increases in this grid section.

A power imbalance and rapid changes of generated power in a grid section may therefore tend to be expected more often. In particular, a generation surplus in an AC voltage grid, which occurs suddenly in the case of a system split and is accompanied by strong frequency fluctuations and steep frequency gradients, cannot be managed in a grid section with a high proportion of converter-based energy generation systems alone using previously known and possibly normatively prescribed methods, in particular not just with a power reduction that is specified externally, in particular centrally by a grid operator depending on the situation, and/or a decentralized frequency-dependent power reduction by way of frequency statics, by way of which the energy generation systems reduce their power in the event of overfrequency in accordance with a P(f) characteristic curve or, as is known for example from EP2759033A1, draw power from the AC voltage grid. An immediate shutdown of the energy generation systems may help in principle to protect the AC voltage grid from collapse, but it entails other disadvantages, for example a loss of earnings for operators of the energy generation system and consequential problems when restarting the energy generation systems after the grid fault has been rectified.

SUMMARY

The disclosure is directed to a method for operating an energy generation system that is able to optimally contribute to stabilizing an AC voltage grid, in particular in the event of a grid fault, and to provide an inverter for an energy generation system that is configured so as to perform the method according to the disclosure.

In a method for operating an energy generation system containing a photovoltaic generator and an inverter, electric power is transferred between the inverter and the AC voltage grid, wherein the transferred electric power comprises an active power and a reactive power, and wherein the photovoltaic generator, in a first operating mode, is operated at a maximum active power point by way of the inverter. A method according to the disclosure includes a second operating mode where the active power is set depending on a grid frequency instantaneous value and on a grid frequency rate of change, and in that, in the second operating mode, the reactive power is set depending on a grid voltage instantaneous value and on a grid voltage rate of change.

The method according to the disclosure allows in particular current-controlled photovoltaic systems containing converter-based inverters without significant energy storage, in the event of a power surplus in electricity grids with a high saturation of renewable energy generation systems, to contribute to frequency stabilization much more quickly and with greater and more predictable negative control power. A P(f) curtailment known from the prior art using frequency statics acts too slowly to stabilize AC voltage grids, in particular those with low inertia in the event of rapid transient frequency changes, in particular in the sub-second range. The present disclosure provides a control method that takes into account additional information, in particular the grid frequency rate of change, in order to contribute more quickly and more effectively to stabilizing the AC voltage grid (in terms of frequency and voltage) in the event of a power surplus in the AC voltage grid.

By virtue of setting the active power of the energy generation system depending on the grid frequency rate of change, the energy generation system is able to react largely without a delay and with large correcting variables, that is to say virtually instantaneously, to large and steep or even sudden frequency changes. If the method is applied to a large number of inverters, it is therefore possible to mobilize sufficiently inexpensive control energy within a very short time in order to effectively counter a large power imbalance after a major fault in an AC voltage grid.

The method may be applied particularly effectively to energy generation systems containing power electronics inverters, since these are distinguished by particularly fast reaction times to external influences, with no communication delays occurring whatsoever in principle. In principle, however, control devices that control a large number of inverters in a larger energy generation system are also suitable for performing the method according to the disclosure. The setting times are essentially in this case limited only by the speed and accuracy of the frequency measurement, which are usually in the range below one grid period by virtue of a PLL with normal settling times, and the dynamics of the control of the current fed in by the inverter. Due to foreseeable technical progress, increasing switching and control frequencies within commercially available inverters contribute to a further improvement in dynamics, and the manufacturing costs for an energy generation system are not increased by the method according to the disclosure.

The disclosure is based on the finding that grid frequency and grid voltage, in the event of fault events in a weak AC voltage grid with reduced inertia and/or high grid impedance, are coupled to one another to a much greater extent than in a conventional AC voltage grid with high inertia and/or low grid impedance. In particular, in a weak AC voltage grid with low inertia and high grid impedance, in addition to the grid frequency, the local grid voltage is also influenced by the active power infeed of the generators (voltage increase with active power infeed, voltage drop with active power draw). It is therefore not sufficient to consider grid voltage and frequency fluctuations as separate control problems with different correcting variables. By virtue of supporting the grid voltage according to the disclosure by setting the reactive power depending on the grid voltage instantaneous value and the grid voltage rate of change, a situation is achieved whereby the energy generation system does not disconnect from the grid due to an overvoltage or undervoltage during the dynamic provision of control power. In contrast to conventional static voltage maintenance through reactive power provision, the energy generation system is not necessarily put into what is called a fault ride-through operating mode in the event of transient grid voltage fluctuations, but rather reacts in an optimal way from the point of view of grid stability with a prioritized provision of active and reactive power.

In one embodiment of the method, in the second operating mode, the active power may additionally be set depending on the grid voltage instantaneous value and/or on the grid voltage rate of change and/or the reactive power may additionally be set depending on the grid frequency instantaneous value and/or on the grid frequency rate of change.

In a further embodiment of the method, depending on properties of the AC voltage grid, in particular depending on an inertia and/or grid impedance of the AC voltage grid established before the energy generation system is started up or determined currently when changing from the first to the second operating mode, a prioritization may be defined on the basis of which, if the active power to be set and the reactive power to be set were to result in an apparent power that is above an apparent power limit value defined for the inverter, it may be established whether, in one embodiment, the active power to be set and a reactive power lower than the reactive power to be set or the reactive power to be set and an active power lower than the active power to be set is set. One property that is relevant here is specified for example by the grid level to which the energy generation system is connected, since for example a low-voltage grid, in particular a local grid, has significantly different properties than a medium-voltage grid or even a transmission grid on the high-voltage level with regard to the ability to influence grid voltage and/or grid frequency through active and/or reactive power infeed. More specifically, these properties relevant to grid support may be described by an inertia and/or a grid impedance from the point of view of the energy generation system, wherein the inertia and/or the grid impedance may be specified as a parameterization of the energy generation system or else determined by the energy generation system or another device in the AC voltage grid depending on the situation. Furthermore, an up-to-date determination of the inertia and/or of the grid impedance may take into account the fact that, from the point of view of the energy generation system, properties of the AC voltage grid may change due to a fault event, in particular if a system split occurs relatively close to the energy generation system.

It should be noted that taking into account such properties of the AC voltage grid may be expedient for prioritization, but is not necessary for the actual dependency of the active and reactive power to be fed in on the grid frequency instantaneous value and grid frequency rate of change or on the grid voltage instantaneous value and grid voltage rate of change. The method according to the disclosure is distinguished in particular by a self-adaptive contribution, as it were, of the energy generation system to grid stabilization, since the properties of the AC voltage grid are reflected in particular in the rates of change of the grid frequency and grid voltage, and taking into account these rates of change therefore already includes taking into account the properties of the AC voltage grid.

In one alternative embodiment of the method, in the second operating mode, if the active power to be set and the reactive power to be set would result in an apparent power that is above an apparent power limit value defined for the inverter, an apparent power may be set, in accordance with the limit value, which, in one embodiment, comprises the active power to be set and a reactive power lower than the reactive power to be set if the grid frequency instantaneous value and/or the grid frequency rate of change is above a respective frequency prioritization limit value, or comprises the reactive power to be set and an active power lower than the active power to be set if the grid voltage instantaneous value and/or the grid voltage rate of change is above a voltage prioritization limit value, or comprises the active power and reactive power with the magnitudes that were set at the last time at which the active power to be set and the reactive power to be set resulted in an apparent power below the apparent power limit value if both the frequency prioritization limit value and the voltage prioritization limit value are exceeded. Specifically, for this purpose, it is possible to specify a frequency prioritization limit value that corresponds to a grid frequency limit value, above which the energy generation system would normally have to disconnect from the grid, or be slightly below it; a voltage prioritization limit value may correspond to a voltage deviation limit value, above which the energy generation system would normally have to disconnect from the grid due to overvoltage or undervoltage, or be slightly below it. In particular, it may thus be ensured that a predominant deviation in the grid frequency is counteracted, for example, by reducing the active power, and that, conversely, any undesired excessive influence on the grid voltage caused by reducing the active power, which may occur in particular at a low-voltage level in a local grid, is avoided by giving preference to a voltage-supporting provision of reactive power.

As a result of the adaptive prioritization between demand-based provision of active power and reactive power in the context of the structurally limited performance of the inverter, that is to say with a limited apparent power of the energy generation system, depending on the current grid inertia, according to the disclosure either the active power is reduced in favor of providing the reactive power or, conversely, the reactive power is reduced in favor of providing active power.

In the method for operating an energy generation system containing a photovoltaic generator and an inverter, in which the inverter is connected to an AC voltage grid and exchanges electric power with the AC voltage grid, and in which the exchanged electric power comprises an active power and a reactive power, the photovoltaic generator may be operated by way of the inverter at an operating point at which the photovoltaic generator outputs a maximum DC power or a predefined DC power reduced in comparison with the maximum DC power. The inverter converts the DC power and feeds it into the AC voltage grid as active power. In addition, an instantaneous grid voltage of the AC voltage grid is measured and an instantaneous voltage deviation of the instantaneous grid voltage from a reference voltage is determined, and the reactive power exchanged between the inverter and the AC voltage grid is set depending on the instantaneous voltage deviation. Furthermore, an instantaneous grid frequency of the AC voltage grid is determined, in particular by way of a PLL in the inverter, and an instantaneous frequency deviation of the instantaneous grid frequency from a reference frequency is determined, and the active power fed into the AC voltage grid by the inverter is reduced depending on the instantaneous frequency deviation if the instantaneous frequency deviation exceeds a first frequency deviation limit value. The first frequency deviation limit value may in this case also be zero, meaning that the active power fed in is reduced depending on the instantaneous frequency deviation as soon as the instantaneous grid frequency deviates from the reference frequency, or define a dead band around a nominal frequency of the AC voltage grid, wherein, at grid frequencies within the dead band, no reduction of the active power depending on the instantaneous frequency deviation is specified. The method according to the disclosure is characterized in that a voltage rate of change is determined from the temporal profile of the grid voltage and the reactive power exchanged between the inverter and the AC voltage grid is set depending on the voltage rate of change. In addition, a frequency rate of change is determined from the temporal profile of the grid frequency and the active power fed into the AC voltage grid by the inverter is reduced depending on the frequency rate of change.

With the method according to the disclosure, it is possible to continuously correct the active power and the reactive power in accordance with settable time constants in the opposite direction to the frequency change or to the voltage change, meaning that the method virtually simulates an inertia of the AC voltage grid and thus has a continuously stabilizing effect on the AC voltage grid.

In one embodiment of the method, the active power fed into the AC voltage grid by the inverter may be reduced to a value less than zero, meaning that the inverter draws active power from the AC voltage grid. This may occur in particular if the instantaneous frequency deviation exceeds a second frequency deviation limit value, the active power fed in has been reduced to zero at a first time depending on an instantaneous frequency deviation and the instantaneous frequency deviation at a second, later time is greater than the frequency deviation at the first time, or if the frequency rate of change exceeds a frequency rate of change limit value. The active power drawn in one of these cases from the AC voltage grid by the inverter is rectified in the inverter and fed back into the photovoltaic generator as DC power by the inverter.

Whereas, in conventional energy generation systems containing photovoltaic generators, regenerative operation of the inverter is generally undesirable and is largely avoided, the method according to the disclosure, on the other hand, extends the operating range of energy generation systems containing photovoltaic generators so as to provide control power around the power absorption capacity of the photovoltaic generators as a load. This results in particular in a larger and reliably predictable negative control power even with little or no solar irradiation, for example at night, and in particular also in parallel with the provision of reactive power at night. Each energy generation system in an AC voltage grid and operated using the method according to the disclosure thus at all times provides at least the possible regenerative power in a secure manner for grid stabilization, and accordingly even more in the event of an instantaneous active power infeed resulting from DC power available from the photovoltaic generator. Furthermore, the predictability of the available absolute negative control power, which is available for curtailment at a certain time, is significantly improved, since the possible regenerative power is available regardless of irradiation-related fluctuations in the DC power. The disclosure thus makes it possible to use the option of dynamic frequency stabilization, which was not previously considered in the prior art, using the photovoltaic generators of an energy generation system without any significant energy store as a load, in particular in the event of a very high and/or suddenly occurring power surplus in the AC voltage grid.

In order to reduce the infeed power of an energy generation system containing photovoltaic generators in the context of conventional frequency statics, the DC power of the photovoltaic generator is usually reduced in that the voltage at the photovoltaic generator, corresponding to the input voltage of the inverter, is increased in the direction of generator no-load along the PV characteristic curve of the photovoltaic generator from the maximum power point (MPP). In one specific implementation of the method according to the disclosure, the voltage at the photovoltaic generator is able to be increased further along the PV characteristic curve in a particularly simple manner in order to achieve a regenerative current in the PV generator. The slope of the PV characteristic curve in the region above the open circuit voltage is in this case so high that even small changes in voltage lead to a large intake current of the PV generator. This proves to be particularly advantageous since high speeds for setting the active power are able to be achieved for grid stabilization in the event of fast transient processes. In this case, due to the increased voltage at the photovoltaic generator, a current with a smaller magnitude than the current at the MPP is necessary in order to feed a negative power back into the photovoltaic generator with a magnitude corresponding to the MPP power.

In one embodiment of the method, the active power may be specified on the basis of an active power setting value that is calculated depending on the instantaneous frequency deviation and the frequency rate of change. In this case, the instantaneous frequency deviation and the frequency rate of change may be assigned membership values of membership functions, an AND operation may be performed on the membership values and the active power setting value may be determined based on a standardized weighting of the linked membership values. This corresponds to a particularly suitable selection of the setting value on the basis of if-then rules in the sense of fuzzy logic, which is particularly suitable for such a complex, non-linear and time-variant system as an AC voltage grid containing a large number of generators and consumers. The reactive power may furthermore be specified on the basis of a reactive power setting value that is calculated depending on the instantaneous voltage deviation and the voltage rate of change, wherein the instantaneous voltage deviation and the voltage rate of change are assigned membership values of membership functions, an AND operation is performed on the membership values and the reactive power setting value is determined based on a standardized weighting of the linked membership values.

An inverter according to the disclosure for an energy generation system containing a photovoltaic generator is characterized in that the inverter is configured so as to perform the described method. The inverter may comprise an AC-side inverter bridge circuit, a DC-side DC voltage converter and a DC voltage intermediate circuit, wherein the DC-side DC voltage converter comprises a diode in the power path and means for bypassing the diode in the event of electric power being fed back into the photovoltaic generator.

BRIEF DESCRIPTION OF THE FIGURES

The disclosure is explained in more detail and described below with reference to exemplary embodiments shown in the figures.

FIG. 5 shows a block diagram of a control function for determining setpoint values for an active power P to be fed in and a reactive power Q to be fed in.

DETAILED DESCRIPTION

Figure 1:
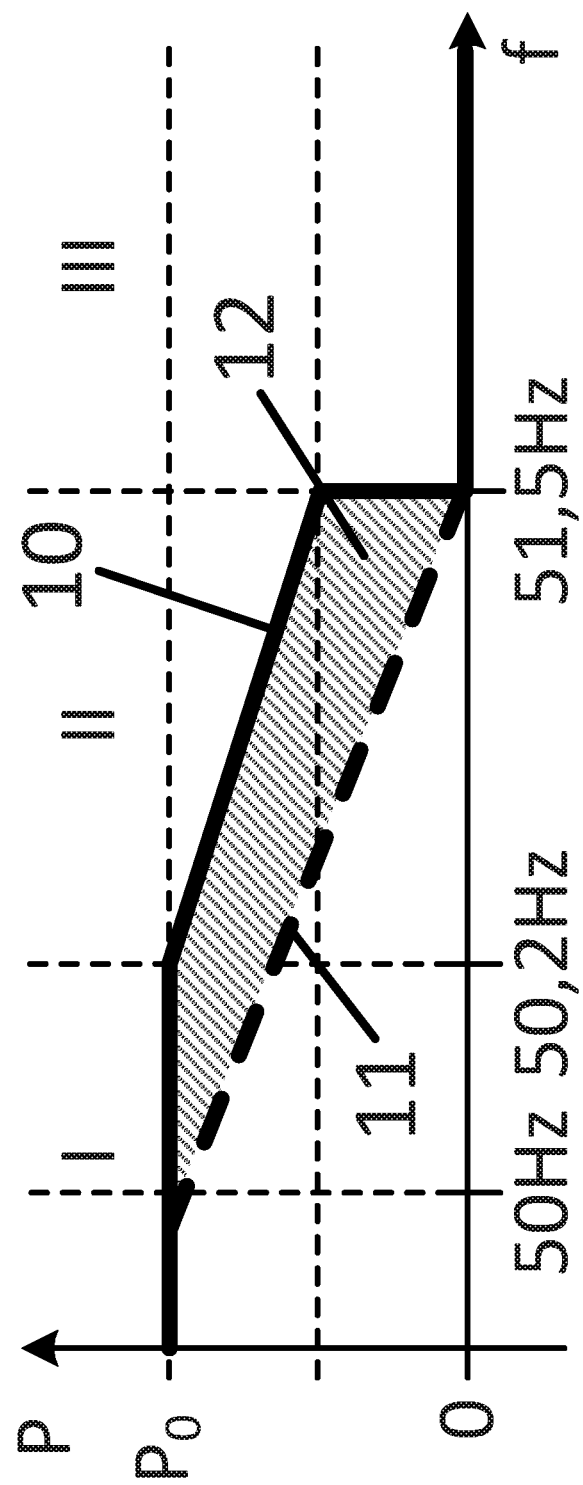
FIG. 1 shows a dependency of an active power P of an energy generation system on a grid frequency f of an AC voltage grid.

FIG. 1 shows an active power P to be set, which is fed into an AC voltage grid by an energy generation system, depending on a grid frequency f of the AC voltage grid. The grid frequency f may be divided into three ranges I, II and III, range I assuming largely fault-free normal operation of the AC voltage grid, and range II containing an overfrequency that needs to be counteracted by the energy generation system. In range III, the grid frequency is so high that the energy generation system is usually supposed to disconnect from the AC voltage grid.

The frequency statics 10 illustrated as a solid line correspond to a conventional dependency of the active power P on the grid frequency f, on the basis of which a decentralized energy generation system sets an electric power P to be fed into the AC voltage grid at a nominal frequency of for example 50 Hz. For this purpose, the voltage of the AC voltage grid is measured at the location of the energy generation system and the grid frequency f of the AC voltage grid is determined from the measured voltage, for example by way of a grid synchronization unit that may comprise a phase-locked loop (PLL), and monitored. As long as the grid frequency f is in a frequency range I, that is to say below 50.2 Hz in this example (and above a lower limit value, not shown, which is well below 50 Hz), the energy generation system is able to feed in an active power $P_0$ that is not subject to any frequency-dependent restrictions and therefore corresponds, for example, to the maximum possible power $P_{MPP}$ of a generator, in particular a photovoltaic generator of the energy generation system, or a power that is below it, for example by a control reserve or due to other external boundary conditions.

If the grid frequency f is in a frequency range II, that is to say in this example between 50.2 Hz and 51.5 Hz, the frequency statics 10 specify a frequency-dependent reduction in the active power P to be fed in, in comparison with the power $P_0$, wherein the frequency statics 10 have a slope of for example 0.4×P0 per Hz in frequency range II. In addition, there may be a requirement that the active power P reduced in this way must be set within a maximum setting time of, for instance, approximately 2 to 5 seconds. If the grid frequency f is in a frequency range III, that is to say above 51.5 Hz in this example, there may be a requirement that the energy generation system must disconnect from the AC voltage grid, that is to say reduces the active power P to zero according to frequency statics 10.

The reduction in the active power P fed in according to the frequency statics 10 thus brings about a frequency-dependent reaction of the energy generation system even before any external commands from superordinate controllers or manual or automatic curtailment commands from the grid operator take effect. In the frequency statics 10, however, only the instantaneous value of the frequency is taken into account, and the required setting times are comparatively high, meaning that the energy generation system reacts comparatively slowly to frequency changes, in particular in frequency range II.

In addition to the frequency statics 10, it is therefore possible to provide a curtailment range 12 with a lower curtailment limit 11 that, in the example according to FIG. 1, extends through frequency range II and partly into frequency range I and drops linearly there, for example. On the basis of an additional dependency of the active power P on a frequency rate of change df/dt, there may be provision for the energy generation system to feed in an active power P that is reduced to a greater extent than is provided by the frequency statics 10 alone. Thus, in the case of a static grid frequency f, the energy generation system feeds in an active power P according to frequency statics 10, whereas, in the case of a dynamic change in the grid frequency f, it feeds in an active power P that is in the curtailment range 12 depending on the frequency rate of change df/dt and leads to a prophylactic reduction in the active power P, even at the standard-compliant grid frequency f in frequency range I, if a frequency rate of change df/dt indicates that the grid frequency f is moving (in particular quickly and/or suddenly) in the direction of frequency range II and into it, and in frequency range II specifies a greater reduction in the active power P than specified by the static frequency statics 10 alone. It goes without saying that the lower curtailment limit 11 and thus the curtailment range 12 also extend further or not as far into frequency ranges I and III and may have a different shape, for example a square or stepped profile. The curtailment range may furthermore also in principle extend into a range above the frequency statics 10; it may be particularly expedient to set an active power P in this range above the frequency statics 10 if the frequency f is for example, on the one hand, in frequency range II and there is thus an overfrequency that is able to be counteracted with an active power that is reduced at least according to the frequency statics 10, on the other hand, however, there is a frequency rate of change df/dt with a negative sign and in particular a large magnitude, which indicates that the frequency f is rapidly dropping, meaning that an underfrequency could potentially arise in the near future, which is countered by an active power P that is (prophylactically) reduced less than specified by the frequency statics 10 on the basis of the current overfrequency.

Figure 2:
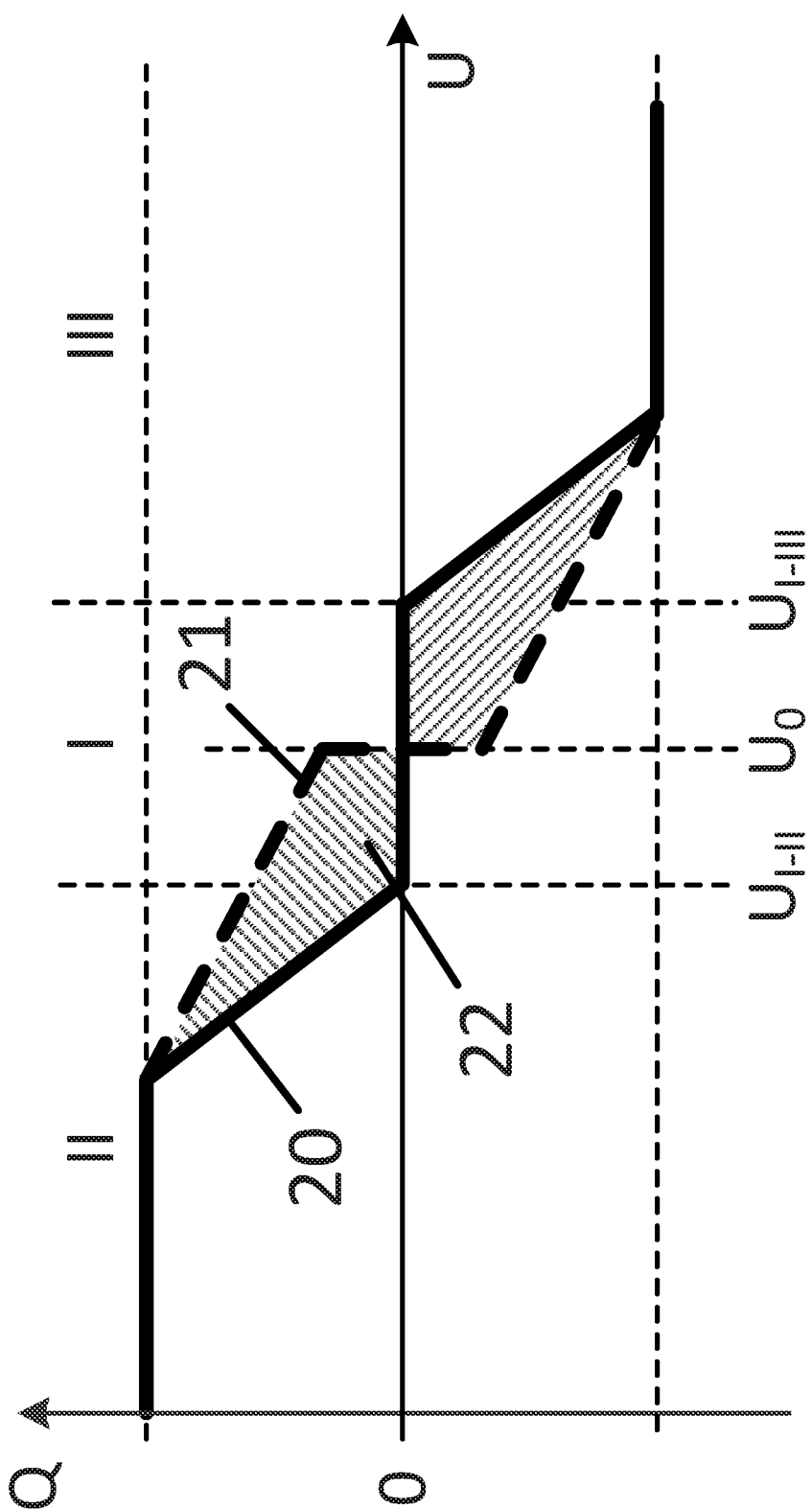
FIG. 2 shows a dependency of a reactive power Q of an energy generation system on a grid voltage of an AC voltage grid.

FIG. 2 shows a reactive power Q to be set, which is fed into the AC voltage grid by the energy generation system, depending on a grid voltage U of the AC voltage grid. The grid voltage U may be divided into three ranges I, II and III, wherein largely fault-free normal operation of the AC voltage grid is assumed in range I, while in range II there is undervoltage and in range III there is an overvoltage, which needs to be counteracted through the provision of capacitive or inductive reactive power by the energy generation system.

The reactive power statics 20 illustrated as a solid line correspond to a conventional dependency of the reactive power Q on the grid voltage U, on the basis of which a decentralized energy generation system provides a reactive power Q to an AC voltage grid with a nominal voltage $U_0$. For this purpose, the temporal profile of the voltage of the AC voltage grid is measured at the location of the energy generation system, and a decisive amplitude of the grid voltage is determined from the measured temporal profile and monitored. As long as the grid voltage U is in a voltage range I, that is to say a largely standard-compliant grid voltage is present, there is no need to feed in reactive power from the energy generation system.

If the grid voltage U is in voltage range II, that is to say in this example below a limit voltage $U_{I-II}$, the reactive power statics 20 specify an infeed of a capacitive reactive power Q with a voltage-dependent amplitude. If the grid voltage U is in voltage range III, that is to say in this example above a limit voltage $U_{I-III}$, the reactive power statics 20 specify an infeed of an inductive reactive power Q with a voltage-dependent amplitude. In this case, the reactive power statics 20 in voltage ranges II and III may each have a linear profile with a slope specified in particular by a grid operator. There may also be a requirement that the reactive power Q requested in this way must be set within a maximum setting time.

The provision of the reactive power Q defined in this way in accordance with reactive power statics 20 thus brings about a voltage-dependent reaction of the energy generation system even before any external commands from superordinate controllers or manual or automatic reactive power requests from the grid operator take effect. In the reactive power statics 20, however, only the instantaneous value of the grid voltage is taken into account, and the required setting times are comparatively high, meaning that the energy generation system reacts comparatively slowly to voltage changes, in particular in voltage ranges II and III.

In addition to the reactive power statics 20, an additional dynamic support range 22 may therefore be provided, which is defined by the reactive power statics 20 and an additional lower or upper reactive power limit 21 and extends through voltage range I and partially into voltage ranges II and III. On the basis of an additional dependency of the reactive power Q on a voltage rate of change dU/dt, there may be provision for the energy generation system to provide a reactive power Q that has a higher magnitude than is provided by the reactive power statics 20 alone. The energy generation system thus sets a reactive power Q in accordance with reactive power statics 20 in the event of a static grid voltage U, whereas, in the event of a dynamic change in the grid voltage U, it provides a reactive power Q that is in the support range 22 depending on the voltage rate of change dU/dt and already leads to prophylactic provision of reactive power Q in the case of a standard-compliant voltage U in voltage range I if a voltage rate of change dU/dt indicates that the grid voltage U is moving into one of voltage ranges II or III, and in voltage ranges II and III specifies a reactive power Q with a larger magnitude than specified by the static reactive power statics alone. It goes without saying that the lower or upper reactive power limit 21 and thus the support range 22 may overlap in voltage range I in such a way that a capacitive or an inductive reactive power Q is already provided if the grid voltage U is still in voltage range I and above or below $U_0$, but it is able to be seen from the voltage rate of change dU/dt that the grid voltage U is changing dynamically and is moving into voltage range II or III. The support range 22 may furthermore also have a different shape, for example a square or stepped profile.

Figure 3:
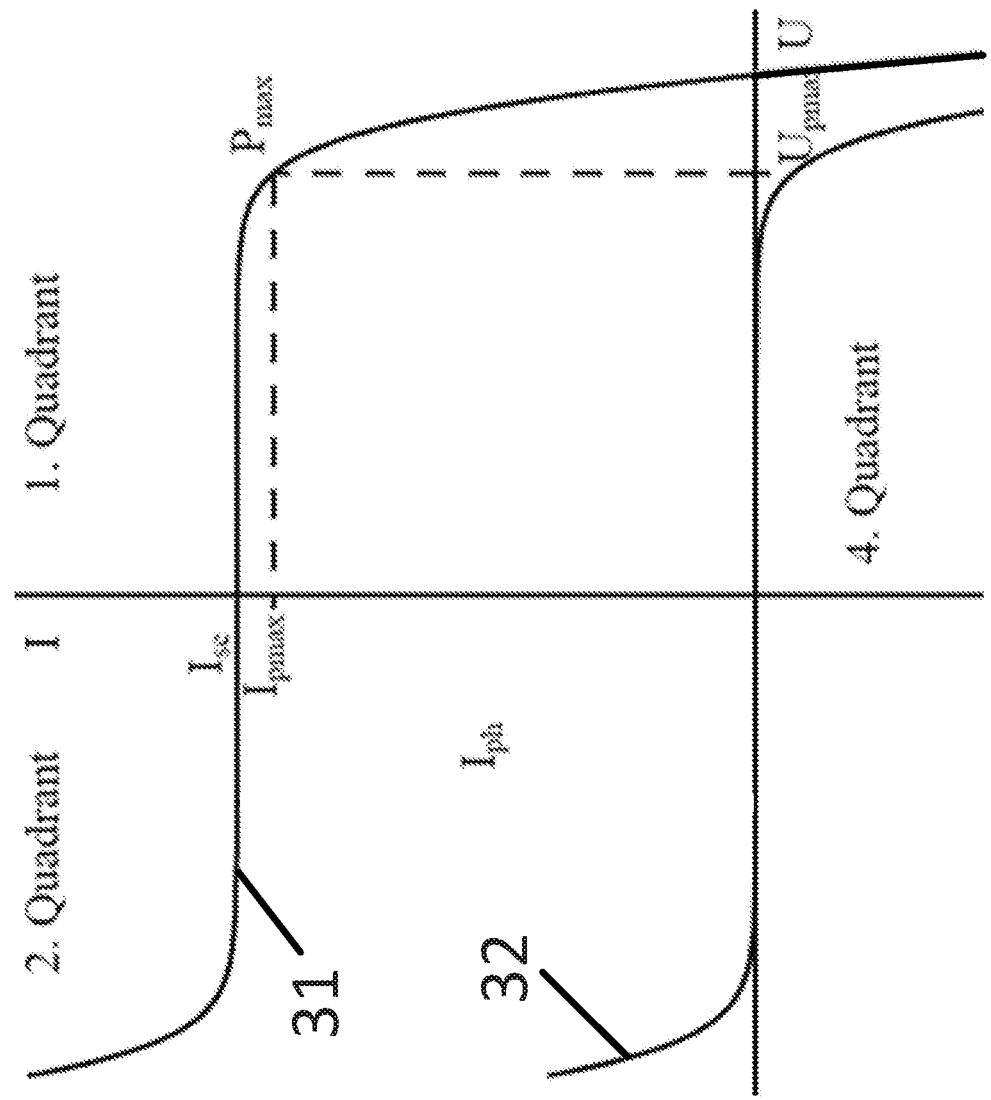
FIG. 3 shows known PV characteristic curves of a photovoltaic generator.

FIG. 3 shows PV characteristic curves 31, 32, known per se, of a photovoltaic generator with different irradiations in a generator numbered arrow system. In this case, a current I is illustrated that flows through the photovoltaic generator when a voltage U is applied to the photovoltaic generator. During normal operation of solar radiation incident on the photovoltaic generator, the photovoltaic generator is operated in pure generator mode in the 1st quadrant since a positive voltage U is applied to the photovoltaic generator, for example by way of an inverter to which the photovoltaic generator is connected, and a current I is established in accordance with the PV characteristic curve 31. In order to draw a maximum possible power $P_{max}$ from the photovoltaic generator, the inverter may set the voltage U along the PV characteristic curve 31 such that the voltage U corresponds to the voltage $U_{pmax}$ at the maximum power point (MPP) and the photovoltaic generator delivers a current $I_{pmax}$. Without solar irradiation, the photovoltaic generator behaves according to the PV characteristic curve 32, so that the current I in the 1st quadrant is zero or less than zero, and consequently the photovoltaic generator cannot generate any power. The slope of the PV characteristic curve 31 in the region greater than the open circuit voltage is in this case so high that even small changes in voltage lead to a very large intake current of the PV generator.

If a voltage U greater than an open circuit voltage is applied to the photovoltaic generator, wherein the open circuit voltage in the illuminated state corresponds to the intersection of the PV characteristic curve 31 with the U axis, then the direction of the current I reverses and the photovoltaic generator consumes electric power, that is to say it operates as a consumer and thus in the 4th quadrant according to FIG. 3. The voltage U able to be applied is in this case limited in that the photovoltaic generator is able to absorb a maximum power that is limited for example by the thermal capacity of the photovoltaic generator. In addition, the maximum voltage U may be limited by structural conditions of the energy generation system, in particular also by a maximum voltage U or a maximum current magnitude I at the input of the inverter.

Even in the non-illuminated state, the photovoltaic generator is able to consume electric power according to the PV characteristic curve 32, provided that a sufficiently high voltage U is applied to the photovoltaic generator and a negative current I flows.

Figure 4:
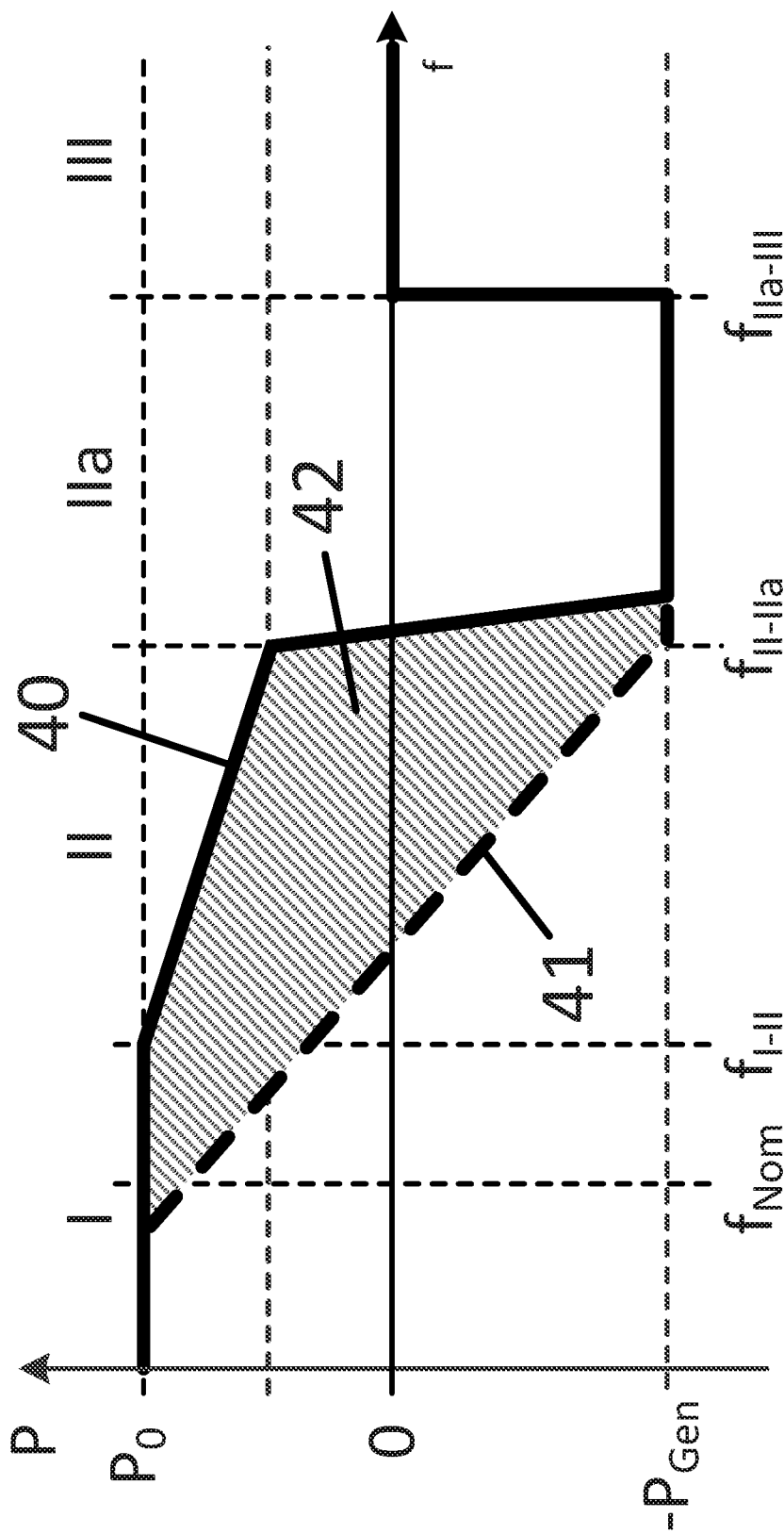
FIG. 4 shows a dependency, modified in comparison with FIG. 1, of an active power P to be set on the grid frequency f of the AC voltage grid.

FIG. 4 shows a dependency, modified in comparison with FIG. 1, of an active power P to be set on the grid frequency f of the AC voltage grid. The grid frequency f may be divided into four ranges I, II, IIa and III, wherein, in the same way as FIG. 1, largely fault-free normal operation of the AC voltage grid at a grid frequency fin the range of the nominal frequency $f_{Norm}$ is assumed in range I, and in range II an overfrequency is present, which needs to be counteracted by the energy generation system. In range IIa, which adjoins range II, according to frequency statics 40, instead of the disconnection provided according to FIG. 1, there may be provision for feedback into the photovoltaic generator, which is able to more effectively counteract any power surplus in the AC voltage grid as the cause of the overfrequency than a disconnection, since active power is drawn from the AC voltage grid and fed back into the photovoltaic generator. It goes without saying that the profile of the frequency statics 40 in range IIa may have a shape other than that shown in FIG. 4, for example a square or stepped profile. In range III, the grid frequency is again so high that the energy generation system should disconnect from the AC voltage grid; failure of the AC voltage grid may be assumed here, wherein ideally all generators and consumers should first of all be disconnected from the AC voltage grid in order to restart the AC voltage grid in a controlled manner.

In addition to the frequency statics 40, it is possible to provide a curtailment range 42 with a lower limit 41 that, in the example according to FIG. 4, extends through frequency range II and partly into frequency ranges I and IIa and drops linearly there, for example. On the basis of an additional dependency of the active power P on a frequency rate of change df/dt, there may be provision for the energy generation system to feed in an active power P that is in the curtailment range 41 depending on the frequency rate of change df/dt and already leads to a prophylactic reduction in the active power P at the standard-compliant grid frequency f in frequency range I, if a frequency rate of change df/dt indicates that the grid frequency f is moving (quickly and/or suddenly) in the direction of frequency range II and into it, and in frequency range II specifies a greater reduction in the active power P than specified by the static frequency statics 10 alone. In addition, the curtailment range 42 extends into a range of negative active power P, in which the energy generation system draws active power from the AC voltage grid and feeds it back into the photovoltaic generator. In the case of a static grid frequency f according to frequency statics 40, the energy generation system thus feeds in a reduced active power P in range II and may draw additional active power from the AC voltage grid in range IIa. In the case of a dynamic change in the grid frequency f, the energy generation system may feed in an active power P or draw it from the AC voltage grid, wherein the magnitude and the sign of the active power P in the curtailment range 42 may be specified on the one hand by the grid frequency f and on the other hand by a dependency on the frequency rate of change df/dt. It goes without saying that the lower limit 41 and thus the curtailment range 42 also extend further or not as far into frequency ranges I and IIa and may have a different shape, for example a square or stepped profile.

In line with current guidelines, when a defined frequency limit $f_{I-II}$ is exceeded, the curtailment of the active power of the energy generation system thus begins with a gradient ΔP/Δf specified for example by standards. If a further defined frequency limit $f_{II-IIa}$ is exceeded or after the active power P of the energy generation system has been completely curtailed to P=0 W, the active power P may be further reduced with the same or a steeper gradient ΔP/Δf if the grid frequency f is increased further, and if necessary be set to a negative value by feeding active power back into the photovoltaic generator. This drawing of active power P from the AC voltage grid may take place until the power balance is restored in the AC voltage grid and the grid frequency f assumes values within permissible tolerances, in particular values in range I. If the grid frequency f exceeds a further defined frequency limit $f_{IIa-III}$ and/or no power balance and no reduction in the grid frequency f into range I is possible with the control power available in the AC voltage grid, the system may be disconnected from the grid.

Figure 5:
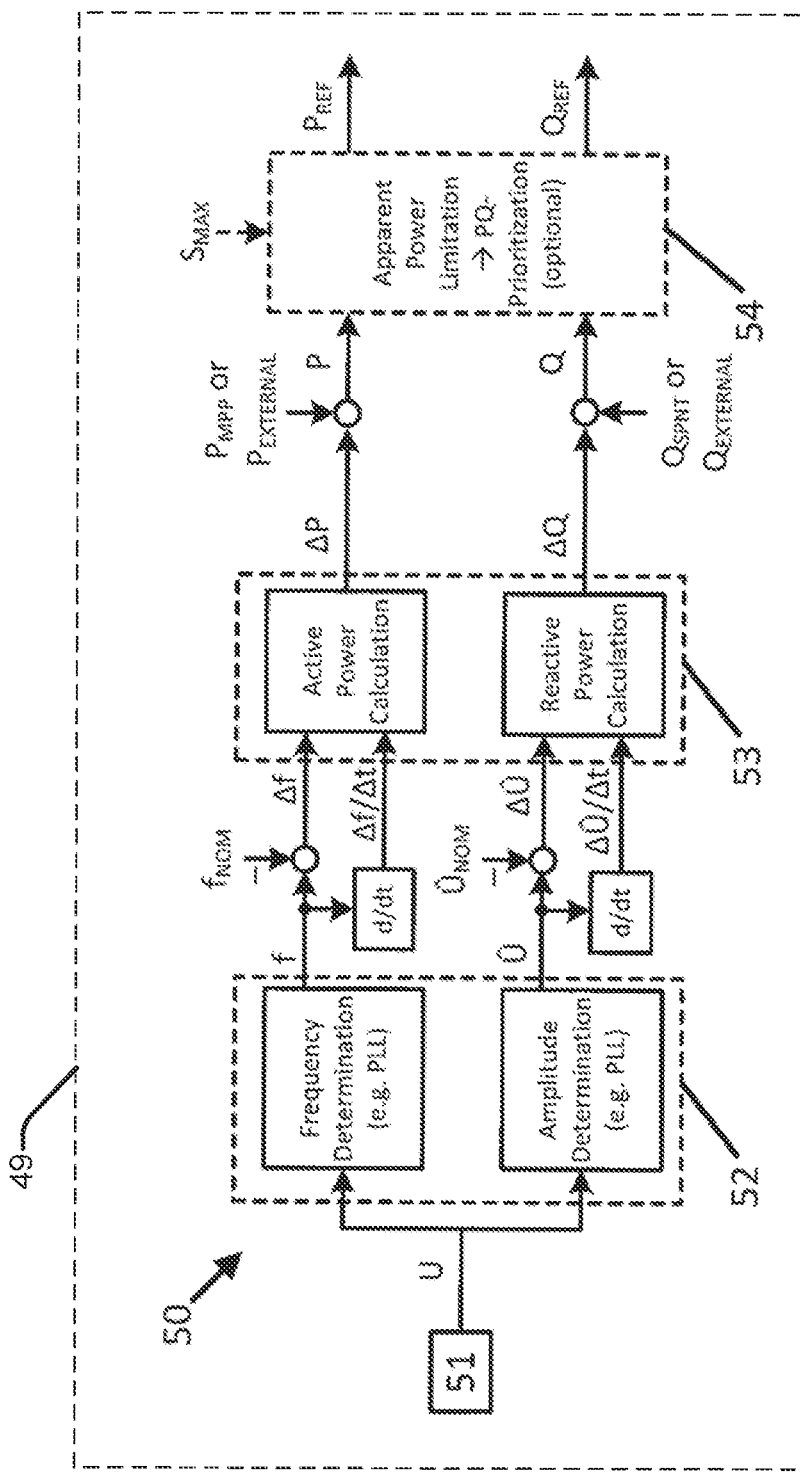

FIG. 5 shows a controlled system 50 responsible for determining setpoint values $P_{setpoint}$, $Q_{setpoint}$ for an active power P to be fed in or a reactive power Q to be fed in. This controlled system 50 may be part of a cascaded control system of an inverter 49 of an energy generation system, wherein the control system comprises for example an inner AC current control loop and an outer DC voltage control loop, such that the DC voltage present at the input of the inverter and thus at the photovoltaic generator is controlled by the AC active current fed into the AC voltage grid by the inverter. In order to implement a negative setpoint value $P_{setpoint}$, that is to say in order to feed active power back into the photovoltaic generator and to set the PV generator operating point accordingly, a negative active current may first of all be calculated from the negative active power setpoint value, and said negative active current may be adjusted directly with the AC control system of the inverter. The negative active current creates a feedback current in an intermediate circuit of the inverter, such that the DC voltage in the intermediate circuit increases. As a result, the input voltage of the inverter and thus the voltage at the photovoltaic generator also increases directly or indirectly via an input-side DC-to-DC converter of the inverter, until a balance is established in the intermediate circuit of the inverter between the power flowing away into the photovoltaic generator and the power drawn from the AC voltage grid. The photovoltaic generator then consumes power in accordance with its current PV characteristic curve 31, 32. The dynamics of this control process may be achieved with a fast rise time of approximately a quarter of the grid period and a settling time of a few grid periods.

Figure 7:
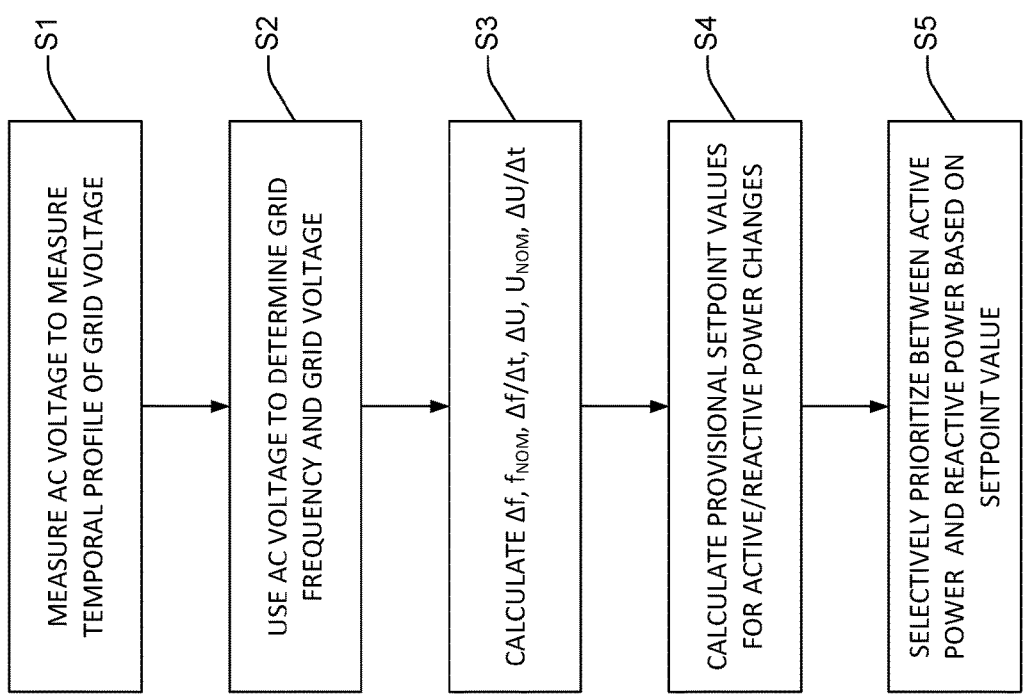
FIG. 7 is a flow chart diagram showing one example of a method according to the present disclosure.

The operation of PV generators as a load according to the disclosure may in principle be integrated into any conventional control method for inverters and increases the available control amplitude of the energy generation system as an actuator on the AC voltage grid. One possible control function 50 for implementing the method according to the disclosure is illustrated in FIGS. 5 and 7. An AC voltage measurement 51 is used to measure a temporal profile of a grid voltage U of the AC voltage grid at S1, and the grid frequency f and the grid voltage Û are determined therefrom at S2, for example by way of a frequency and amplitude determination unit 52 (for example a PLL), and continuously monitored. A frequency deviation $\Delta f$ from a nominal frequency $f_{Nom}$, a frequency rate of change $\Delta f/\Delta t$, a voltage deviation $\Delta \hat{U}$ from a nominal voltage $\hat{U}_{Nom}$ and a voltage rate of change $\Delta \hat{U}/\Delta t$ are calculated therefrom at S3. In a calculation block 53, a (provisional) setpoint value for an active power change $\Delta P$ is calculated at S4 from the frequency deviation $\Delta f$ and the frequency rate of change $\Delta f/\Delta t$, in particular on the basis of one of the example dependencies of the active power P on the grid frequency f shown in FIG. 1 and FIG. 4. A (provisional) setpoint value for a reactive power change $\Delta Q$ is also calculated at S4 in the calculation block 53 from the voltage deviation $\Delta \hat{U}$ of the voltage rate of change $\Delta \hat{U}/\Delta t$, in particular on the basis of the exemplary dependency of the reactive power Q on the grid voltage Û and the voltage rate of change $\Delta \hat{U}/\Delta t$ shown in FIG. 2. The (provisional) setpoint values $\Delta P$, $\Delta \hat{U}$ are added to current values of the maximum power $P_{MPP}$ or a specified active power $P_{External}$ and to current values of the instantaneous reactive power $Q_{SPTN}$ or a specified reactive power $Q_{External}$. In a limiting block 54, a prioritization between active power P and reactive power Q is possibly carried out at S5 if the (provisional) values to be set for the active power P and the reactive power Q taken together would result in an apparent power S that would be higher than a predetermined apparent power limit value $S_{Max}$ of the inverter. As a result, the control function 50 according to FIG. 5 delivers setpoint values $P_{Ref}$, $Q_{Ref}$ for the active power P to be set and the reactive power Q to be set, which are implemented in the further method steps as part of the further control and regulation of the inverter such that a corresponding active power $P_{Ref}$ and a corresponding reactive power $Q_{Ref}$ are exchanged between the inverter and the AC voltage grid.

Figure 6:
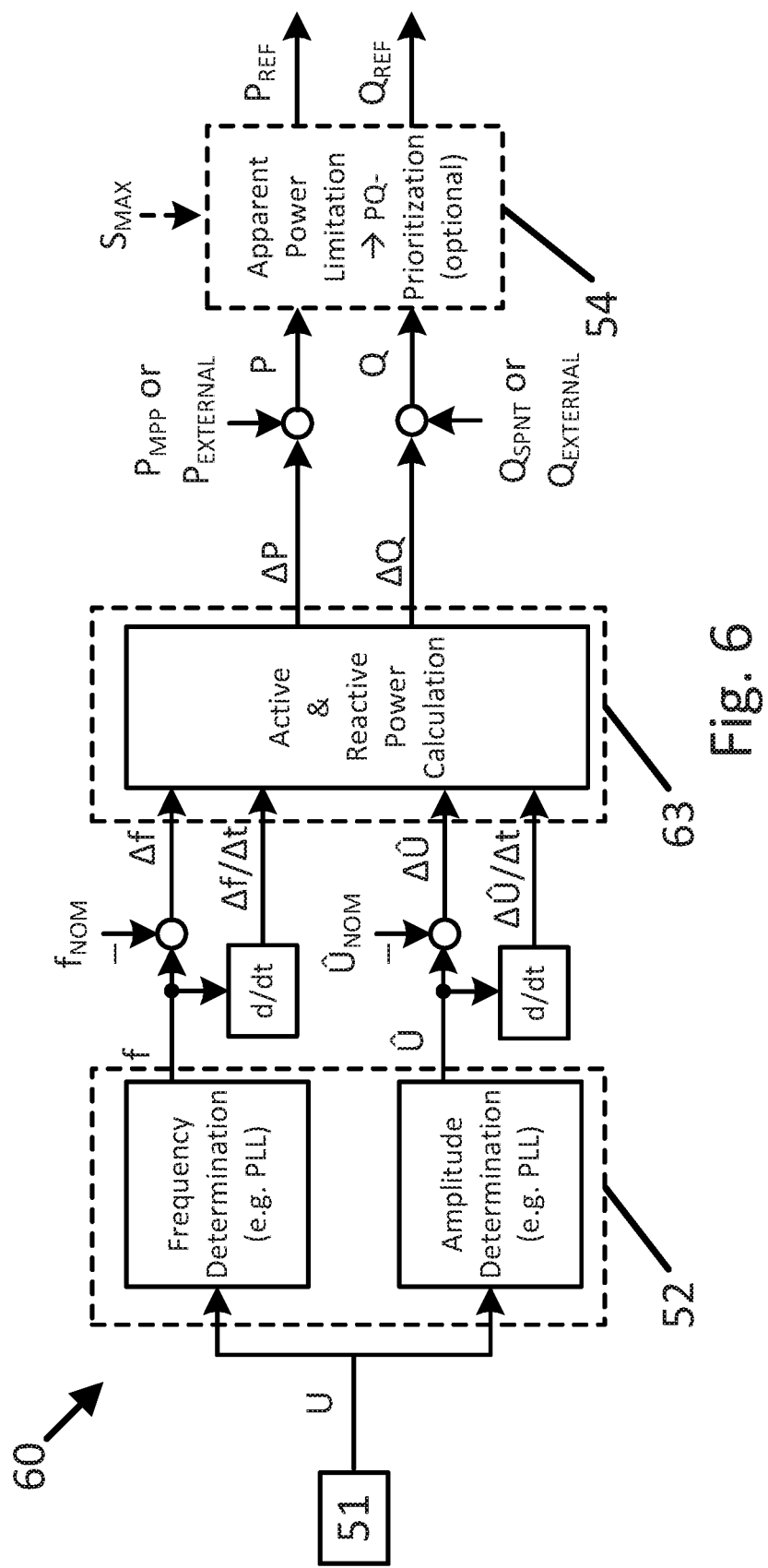
FIG. 6 shows a block diagram of a control function modified in comparison with FIG. 5.

FIG. 6 shows a controlled system 60 modified in comparison with FIG. 5, in which the setpoint values for the active power change $\Delta P$ and for the reactive power change $\Delta Q$ and thus also the corresponding setpoint values $P_{Ref}$, $Q_{Ref}$ in the calculation block 63 are determined in each case taking into account all four variables frequency deviation $\Delta f$, frequency rate of change $\Delta f/\Delta t$, voltage deviation $\Delta \hat{U}$ and voltage rate of change $\Delta \hat{U}/\Delta t$. For this purpose, algorithms are stored in the calculation block 63, which algorithms on the one hand suitably take into account the dependencies of the active power P on the grid frequency f, in particular according to FIG. 1 or FIG. 4, and of the reactive power Q on the grid voltage U, in particular according to FIG. 3, and on the other hand suitably take into account any mutual dependencies of the grid frequency f on the reactive power Q and of the grid voltage Û on the active power P.

The values to be set for the reactive power and the active power may be calculated by way of separate rule bases according to calculation block 53 in FIG. 5 or by way of a common rule base according to calculation block 63 in FIG. 6 using IF-THEN rules and relying on human behavior by way of fuzzy logic. As a rough summary, for example, in order to determine the active power P to be set, which is expedient for maintaining the grid stability based on the grid state, it may first of all be determined whether the grid frequency deviation $\Delta f$ is in the normal range and the frequency rate of change $\Delta f/\Delta t$ is in the normal range; the instantaneously available MPP power $D_{MPP}$ or a smaller active power $P_{external}$ may then be fed in, the latter if it is necessary to derate the inverter for any reason (temperature limits, inverter current limits, external specifications, etc.). If however the grid frequency f or the frequency rate of change $\Delta f/\Delta t$ is higher than a respective limit value, then the active power P may be reduced by $\Delta P$ according to FIG. 1 or FIG. 4 and as much active power P as possible may be drawn from the AC voltage grid and fed back into the photovoltaic generator as load; in this case, the energy generation system is not disconnected from the AC voltage grid. Accordingly, in particular in order to determine the reactive power Q to be set, which is expedient for maintaining grid stability on the basis of the grid state, it may first of all be determined whether the grid voltage and the voltage rate of change $\Delta \hat{U}/\Delta t$ are in the normal range; there is then no need to feed reactive power Q into the grid or a (small) compensation reactive power $Q_{spnt}$ or $Q_{external}$ may be provided, the latter if this is necessary for any reason (AC filter reactive power consumption, etc.). If however the deviation of the grid voltage $\Delta \hat{U}$ or the voltage rate of change $\Delta \hat{U}/\Delta t$ is greater than a respective limit value, then a counteracting reactive power Q may be set according to FIG. 2.

What are known as membership functions may be used to specifically calculate the active power P to be set and the reactive power Q to be set, by way of which it is possible to define the extent to which a given value of a variable belongs to one of several possible states. By way of example, a membership function may be defined for the variable grid frequency f that includes the three states "normal operation", "curtailment" and "grid disconnection" and specifies the extent to which a given value of the grid frequency f belongs to which of the three said states; a grid frequency f close to the nominal frequency $f_{Nom}$ with a membership value of 1 may in this case in particular be assigned to the "normal operation" state, whereas a frequency above a first limit value of 50.2 Hz or $f_{I-II}$ with a membership value between zero and 1 is assigned to the "normal operation" state and a complementary membership value between zero and 1 is assigned to the "curtailment" state. A frequency f above a second limit value of 51.5 Hz or $f_{IIa-III}$ may then, with a membership value of 1, be assigned "grid disconnection" state. Such membership functions may be used in particular for the respective relationships between grid frequency f and curtailment or disconnection, between frequency rate of change $\Delta f/\Delta t$ and curtailment or disconnection, between active power P and operating mode (normal operation/curtailment), between grid voltage Û and reactive power infeed Q (no excitation/underexcited/overexcited), between voltage rate of change $\Delta U/\Delta U$ and reactive power Q (no excitation/underexcited/overexcited) and between reactive power Q and operating mode (no infeed/capacitive/inductive infeed). Overall, these membership functions may define a multi-dimensional characteristic diagram.

One specific calculation of the active power P to be set and the reactive power Q to be set may then include in particular the following steps. On the basis of the AC voltage measurement 51, a grid frequency f and the amplitude of the grid voltage Û may be determined by way of a frequency and amplitude determination unit 52 (for example a PLL). Deviations $\Delta f$, $\Delta \hat{U}$ from the respective nominal value and, by differentiation, the frequency and voltage rates of change $\Delta f/\Delta t$, $\Delta \hat{U}/\Delta t$ are determined from the grid frequency f and the grid voltage $\hat{U}$ and continuously monitored. For the determined values of $\Delta f$, $\Delta f/\Delta t$, $\Delta \hat{U}$ and $\Delta \hat{U}/\Delta t$, membership values of membership functions may then be determined in the context of what is known as a fuzzification. In the context of what is known as an aggregation & implication, an AND operation may then be performed on the determined membership values. The result of the AND operation may be used in the context of what is known as an accumulation & defuzzification to calculate the active power P to be set and the reactive power Q to be set using a respective standardized weighting formula.

In addition, it is possible to perform prioritization between the active power P to be set and the reactive power Q to be set, in particular if a determined combination of an active power P to be set and a reactive power Q to be set is not actually able to be set because the energy generation system or the inverter is not technically capable of providing a corresponding resultant apparent power S. It may additionally be taken into account in this case that a provision to be taken in order to stabilize one parameter of the grid state must not lead to the destabilization of another parameter of the grid state; for example, an active power reduction in a weak grid must not cause any voltage changes that affect the grid voltage $\hat{U}$ in such a way that it falls below a limit value.

Based on taking into account both the grid frequency instantaneous value f and the frequency rate of change $\Delta f/\Delta t$, the method enables a stepless, steady setting of active power and a rapid reaction of the energy generation system in the case of overfrequency. After a major fault, the energy generation system in this case remains curtailed or in load operation until the control deviation of the grid frequency f and the frequency rate of change $\Delta f/\Delta t$ return to normal values. The active power P may be restored automatically with the curtailment dynamics of other, slower generators in the grid section. After the fault has been rectified, the energy generation systems are able to feed in the irradiation-dependent MPP power again using this method. In the event of an overfrequency remaining in a stationary state, there may be ongoing curtailment, which is however often able to be corrected again slowly by voltage-generating energy generation systems. Persistent control deviations are however not accumulated in one embodiment in order to correct them completely, since a single energy generation system operated using the described method is not able to do this, this in particular being the case when the nominal electric power rating of the individual generation system is much smaller than the total generated power in the AC voltage grid.

With regard to the technical requirements placed on an energy generation system or an inverter of an energy generation system, it should be noted that in particular two-stage inverters with upstream DC-to-DC converters may under some circumstances have a diode in the current path between the DC current generator and inverter bridge circuit, these diodes being able to block feedback into the generator. Such inverters require a slight modification, for example in the form of a bypass option for the diode, which may in particular comprise a bypass switch. For regenerative operation, such a bypass switch may be closed immediately before the energy generation system begins to consume active power.

The disclosure describes a possibility of operating current-controlled energy generation systems containing a photovoltaic generator but without a significant electrical energy store as a load for the purpose of frequency stabilization. It makes it possible to expand the control range of energy generation systems on the grid in comparison with the prior art and to contribute with high dynamics to the grid stabilization of an AC voltage grid with high saturation by converter-based feeders.

The disclosure extends the PQ control range of energy generation systems containing photovoltaic generators from two to four quadrants. In the best case, twice the amount of negative control power is available in comparison to the prior art. In principle, it is possible according to the disclosure to provide a less irradiation-dependent, defined, absolute, negative control power by operating the photovoltaic generators of the energy generation system as a load.

This provides a grid operator with expanded grid support options in the event of major events using energy generation systems, wherein inverters of energy generation systems containing photovoltaic generators are suitable as generators, in particular as rapidly controllable loads for frequency stabilization purposes.

The invention claimed is:

1. A method for operating an energy generation system containing a photovoltaic generator and an inverter, wherein electric power is transferred between the inverter and an AC voltage grid, wherein the transferred electric power comprises an active power (P) and a reactive power (Q), comprising:
   operating the photovoltaic generator, in a first operating mode, at a maximum active power point (MPP) by way of the inverter; and
   setting the active power (P) of the photovoltaic generator via the inverter in a second operating mode depending on a grid frequency instantaneous value (f) and on a grid frequency rate of change (df/dt), and in the second operating mode, setting the reactive power (Q) depending on a grid voltage instantaneous value (U) and on a grid voltage rate of change (dU/dt).

2. The method as claimed in claim 1, further comprising:
   setting the active power (P) in the second operating mode depending on the grid voltage instantaneous value (U) and/or on the grid voltage rate of change (dU/dt); and/or
   setting the reactive power (Q) depending on the grid frequency instantaneous value (f) and/or on the grid frequency rate of change (df/dt).

3. The method as claimed in claim 1, further comprising:
   in the second operating mode, depending on an inertia and/or a grid impedance of the AC voltage grid as determined before the energy generation system is started up or when changing from the first to the second operating mode, defining a prioritization of (1) or (2) on the basis of which, when the active power (P) to be set and the reactive power (Q) to be set result in an apparent power (S) to be set that is above an apparent power limit value ($S_{Max}$) defined for the inverter, either
   (1) the active power (P) to be set and a reactive power lower than the reactive power (Q) to be set is set, or
   (2) the reactive power (Q) to be set and an active power lower than the active power (P) to be set is set.

4. The method as claimed in claim 1, further comprising:
   in the second operating mode, when the active power (P) to be set and the reactive power (Q) to be set result in an apparent power (S) to be set that is above an apparent power limit value ($S_{Max}$) defined for the inverter, an apparent power (S) is set, in accordance with the apparent power limit value according to one of the following:
   the active power (P) to be set and a reactive power lower than the reactive power (Q) to be set when the grid frequency instantaneous value (f) and/or the grid frequency rate of change (df/dt) is above a respective frequency prioritization limit value, or the reactive power (Q) to be set and an active power lower than the active power (P) to be set when the grid voltage instantaneous value (U) and/or the grid voltage rate of change (dU/dt) is above a voltage prioritization limit value, or the active power (P) and the reactive power (Q) with magnitudes that were set at a last time at which the active power (P) to be set and the reactive power (Q) to be set resulted in an apparent power (S) below the apparent power limit value ($S_{Max}$) when both the frequency prioritization limit value and the voltage prioritization limit value are exceeded.

5. The method as claimed in claim 1, further comprising:
reducing the active power (P) fed into the AC voltage grid by the inverter to a value less than zero, such that the inverter draws active power (P) from the AC voltage grid when:
  an instantaneous frequency deviation (df) exceeds a second frequency deviation limit value, or
  the active power (P) fed in has been reduced to zero at a first time depending on an instantaneous frequency deviation (df) and the instantaneous frequency deviation (df) at a second, later time is greater than the instantaneous frequency deviation (df) at the first time, or
  the grid frequency rate of change (df/dt) exceeds a frequency rate of change limit value, and
rectifying the active power (P) thus drawn and feeding it back into the photovoltaic generator as DC power by way of the inverter.

6. The method as claimed in claim 1, further comprising:
specifying the active power (P) based on an active power setting value ($P_{Ref}$) that is calculated depending on the instantaneous frequency deviation (df) and the grid frequency rate of change (df/dt),
wherein the instantaneous frequency deviation (df) and the grid frequency rate of change (df/dt) are assigned membership values of membership functions, an AND operation is performed on the membership values, and the active power setting value ($P_{Ref}$) is determined based on a standardized weighting of the membership values.

7. The method as claimed in claim 1, further comprising:
specifying the reactive power (Q) based on a reactive power setting value ($Q_{Ref}$) that is calculated depending on an instantaneous voltage deviation (dU) and the grid voltage rate of change (dU/dt),
wherein the instantaneous voltage deviation (dU) and the grid voltage rate of change (dU/dt) are assigned membership values of membership functions, an AND operation is performed on the membership values and the reactive power setting value ($Q_{Ref}$) is determined based on a standardized weighting of the linked membership values.

8. A method for operating an energy generation system containing a photovoltaic generator and an inverter, wherein the inverter is connected to an AC voltage grid and exchanges electric power with the AC voltage grid, wherein the exchanged electric power comprises an active power (P) and a reactive power (Q), comprising:
operating the photovoltaic generator by way of the inverter at an operating point (MPP) at which the photovoltaic generator outputs a maximum DC power or a predefined DC power reduced in comparison with the maximum DC power,
converting the DC power to AC power and feeding the AC power into the AC voltage grid as active power (P) by way of the inverter,
measuring an instantaneous grid voltage (U) of the AC voltage grid,
determining an instantaneous voltage deviation (dU) of the instantaneous grid voltage (U) from a reference voltage ($U_0$),
setting the reactive power (Q) exchanged between the inverter and the AC voltage grid depending on the determined instantaneous voltage deviation (dU),
determining an instantaneous grid frequency (f) of the AC voltage grid,
determining an instantaneous frequency deviation (df) of the instantaneous grid frequency (f) from a reference frequency ($f_{Nom}$),
reducing the active power (P) fed into the AC voltage grid by the inverter depending on the instantaneous frequency deviation (df) when the instantaneous frequency deviation (df) exceeds a first frequency deviation limit value,
determining a voltage rate of change (dU/dt) from a temporal profile of the instantaneous grid voltage (U),
setting the reactive power (Q) exchanged between the inverter and the AC voltage grid depending on the voltage rate of change (dU/dt),
determining a frequency rate of change (df/dt) from a temporal profile of the instantaneous grid frequency (f), and
reducing the active power (P) fed into the AC voltage grid by the inverter depending on the frequency rate of change (df/dt).

9. The method as claimed in claim 8, further comprising:
reducing the active power (P) fed into the AC voltage grid by the inverter to a value less than zero, such that the inverter draws active power (P) from the AC voltage grid when:
  the instantaneous frequency deviation (df) exceeds a second frequency deviation limit value, or
  the active power (P) fed in has been reduced to zero at a first time depending on an instantaneous frequency deviation (df) and the instantaneous frequency deviation (df) at a second, later time is greater than the frequency deviation (df) at the first time, or
  the frequency rate of change (df/dt) exceeds a frequency rate of change limit value, and
rectifying the active power (P) thus drawn and feeding it back into the photovoltaic generator as DC power by way of the inverter.

10. The method as claimed in claim 8, further comprising:
specifying the active power (P) based on an active power setting value ($P_{Ref}$) that is calculated depending on the instantaneous frequency deviation (df) and the frequency rate of change (df/dt),
wherein the instantaneous frequency deviation (df) and the frequency rate of change (df/dt) are assigned membership values of membership functions, an AND operation is performed on the membership values, and the active power setting value ($P_{Ref}$) is determined based on a standardized weighting of the linked membership values.

11. The method as claimed in claim 8, further comprising:
specifying the reactive power (Q) based on a reactive power setting value ($Q_{Ref}$) that is calculated depending on the instantaneous voltage deviation (dU) and the voltage rate of change (dU/dt), wherein the instantaneous voltage deviation (dU) and the voltage rate of change (dU/dt) are assigned membership values of membership functions, an AND operation is performed on the membership values and the reactive power setting value ($Q_{Ref}$) is determined based on a standardized weighting of the linked membership values.

12. An inverter for an energy generation system containing a photovoltaic generator, wherein when the inverter is coupled to the photovoltaic generator and an AC power generating grid, the inverter is configured to perform a method, wherein when the inverter when connected to the AC power generating grid exchanges electric power with the AC power generating grid, wherein the exchanged electric power comprises an active power (P) and a reactive power (Q), the method comprising:

operating the photovoltaic generator by way of the inverter at an operating point (MPP) at which the photovoltaic generator outputs a maximum DC power or a predefined DC power reduced in comparison with the maximum DC power, converting the DC power to AC power and feeding the AC power into the AC voltage grid as active power (P) by way of the inverter, measuring an instantaneous grid voltage (U) of the AC power generating grid, determining an instantaneous voltage deviation (dU) of the instantaneous grid voltage (U) from a reference voltage ($U_0$), setting the reactive power (Q) exchanged between the inverter and the AC voltage grid depending on the measured instantaneous voltage deviation (dU), determining an instantaneous grid frequency (f) of the AC voltage grid, determining an instantaneous frequency deviation (df) of the instantaneous grid frequency (f) from a reference frequency ($f_{Nom}$), reducing the active power (P) fed into the AC voltage grid by the inverter depending on the instantaneous frequency deviation (df) when the instantaneous frequency deviation (df) exceeds a first frequency deviation limit value, determining a voltage rate of change (dU/dt) from a temporal profile of the grid voltage (U), setting the reactive power (Q) exchanged between the inverter and the AC voltage grid depending on the voltage rate of change (dU/dt), determining a frequency rate of change (df/dt) from a temporal profile of the grid frequency (f), and reducing the active power (P) fed into the AC voltage grid by the inverter depending on the frequency rate of change (df/dt).

13. The inverter as claimed in claim 12, comprising an AC-side inverter bridge circuit, a DC-side DC voltage converter and a DC voltage intermediate circuit, wherein the DC-side DC voltage converter comprises a diode in a power path and means for bypassing the diode in the event of electric power being fed back into the photovoltaic generator.

* * * * *